Patented Aug. 30, 1938

2,128,340

UNITED STATES PATENT OFFICE 2,128,340

METHOD OF PRODUCING STABLE SOLUTIONS OF CELLULOSE TRIACETATE

Karl Werner, Mainz-Mombach, Germany

No Drawing. Application October 9, 1937,
Serial No. 168,292

4 Claims. (Cl. 260—102)

The present invention relates to a method of producing solutions of cellulose triacetate, and, more particularly, to a method of producing solutions of cellulose triacetate capable of remaining stable and liquid in the reaction mixture.

It is well known that when acetylating cellulose irrespective of whether cotton "linters" or wood cellulose was used, triacetyl cellulose was first produced which thus far had little practical use. As a matter of fact, due to the low stability of triacetyl cellulose solutions, it was necessary to produce a stable solution by resaponification of the triacetate into the form of acetyl cellulose soluble in acetone in order to prevent the irreversible coagulation of the original solution to an insoluble gel. It has also been customary to precipitate the triacetyl cellulose from the original solution. In this case, it was necessary to use chlor-hydrocarbons, such as methylene dichloride, tetrachlorethane, and chloroform-alcohol for solvents for the purpose of producing artificial fibers or foils. All of these solvents have great disadvantages in manufacturing processes due to their great poisonousness and due to their inclination to split off hydrochloric acid which made it difficult to preserve the original properties of ecetyl cellulose. It has likewise been suggested to make the triacetyl cellulose solutions stable by means of certain additions such as formaldehyde. The use of formaldehyde did not prove to be advantageous and has been never applied practically because the addition of formaldehyde caused uncontrollable reactions which detrimentally affect the properties of the thus-treated acetyl cellulose. Triacetyl cellulose has great importance due to a number of reasons including the fact that artificial fibers made of triacetyl cellulose possess an increased resistance to water and an increased tensional strength. Although many proposals have been made to solve the outstanding problem, none, as far as I am aware, has been wholly satisfactory, successful and practical, especially when conducted on a commercial scale.

I have discovered a method of producing stable solutions of cellulose triacetate which are substantially free from coagulation.

It is an object of the present invention to provide a method of producing a practically indefinitely stable triacetate solution which may be carried into practice very easily and which has substantially no detrimental influence on the quality of the acetyl cellulose.

A further object of the invention is to provide a method of producing stable solutions of triacetate of cellulose which can be carried into practice easily and satisfactorily on an industrial scale.

It is another object of the invention to provide a method of producing acetyl cellulose solutions of high stability which will remain liquid for an extended period of time.

It is also within the contemplation of the invention to provide a method capable of converting practically all cellulose triacetate solutions into stable solutions which can be maintained in a practically unsaponified condition.

Other objects and advantages of the invention will become apparent from the following description.

Broadly stated, it has been discovered that stable solutions of triacetate of cellulose in acetic acid may be obtained. Solutions prepared in accordance with the principles of the present invention have an exceptionally high concentration of triacetate of cellulose.

In accordance with the principles of the present invention, the acetylating solution is heated or maintained at elevated temperatures after the acetylation has been completed thereby converting substantially all of the cellulose to triacetate of cellulose having an acetyl content of about 62%. It has been discovered that for the production of stable solutions of triacetate of cellulose it is necessary to neutralize the catalyst present in the acetylating solution before heating to avoid resaponification of the triacetate to other forms of the acetate having a lower concentration of acetic acid. It is possible by proceeding in accordance with the principles of the present invention to obtain solutions of triacetate of cellulose containing about 120 to about 220 grams of cellulose triacetate per liter which are stable and remain stable for a considerable period of time.

Stable triacetate of cellulose solutions such as are produced by the present process may be used for casting or spinning foils as thin as 1/100 mm. in thickness.

For the purpose of giving those skilled in the art a better understanding of the present invention, the following examples will be given by way of illustration.

*Example No. I*

Cellulosic material is acetylated in the usual manner using as a catalyst, sulfuryl chloride. Small amounts of the catalyst are added from time to time in accordance with customary practice. After the acetylation is complete and when a sample of the acetate when isolated assays about 62% acetic acid, the catalyst is neutralized by the addition of sodium acetate. The solution after the catalyst is neutralized is heated for from 4 to 6 hours at temperatures of about 80° C. to about 100° C. During the heating of the solution the acetate does not resaponify and the acetyl content approximates that of the true cellulose triacetate. This stabilizing treatment is carried out in accordance with the following example:

To an acetylation solution containing about 120 to about 220 grams of cellulose acetate of about 62% "acetyl" content, sodium acetate is added, in an excess of 10-20%, more than wanted for neutralization of the catalyst. The solution is then heated at about 80° C. to about 100° C. for 4 to 6 hours. During the heating the "acetyl" value of the cellulose acetate is determined at intervals and great care taken to prevent saponification. The solution before heating coagulates upon cooling whereas after the aforesaid heat treatment and upon cooling no irreversible gel formation occurs. A comparison of the solution before heating with that after heating is possible in conjunction with the following table:

Table

| Heating time, hours at 90° | Acetyl content of product | Solubility of product in acetone | Colloidal stability at 18° |
|---|---|---|---|
| 0 | 62.0 | No | Coagulation. |
| 2 | 62.0 | No | Do. |
| 4 | 61.5 | No | No coagulation. |
| 6 | 61.0 | No | Do. |
| 36 | 56 | Yes | Do. |

From this table it may be seen that in order to obtain acetone soluble products the solution must be heated much longer than when a non-coagulating solution with practically unchanged acetyl content is obtained.

*Example No. II*

In a similar manner, an acetylating solution containing all the cellulose as cellulose triacetate containing about 62% acetic acid is prepared by using small amounts for example 0.25%, of sulphuric acid, as a catalyzer. After the acetylation is complete, the catalyst is neutralized by the addition of sodium acetate to the acetylation mixture. The excess acetic anhydride is removed by adding water in form of 76% acetic acid so that finally in the mixture to be treated the acetic acid is present in form of 96-98% acetic acid. The resulting cellulose triacetate solution substantially free from acetic anhydride is heated for about 4 to about 6 hours at 80-100°. It has been found that the cellulose triacetate prepared in the foregoing manner does not saponify and the "acetyl" content remains about 60 to about 62%. This solution does not coagulate for months, the viscosity of the cellulose acetate determined in formic acid remaining constant.

*Example No. III*

Solutions of triacetate of cellulose obtained by acetylation in the presence of sulphuric acid as a catalyst at temperatures below 50° C. readily coagulate and pass into the irreversible gel condition when treated in accordance with conventional methods. However, the formation of an irreversible gel and the accompanying insolubility of prior products may be obviated by neutralizing the catalyst and heating at about 80° C. to about 100° C. for about 4 to 6 hours in accordance with the principles of the present invention.

*Example No. IV*

A modified embodiment of the present invention includes preparing a solution of cellulose triacetate containing about 120 grams to about 220 grams per kilo in the usual manner using small amounts i. e. less than 0.7% of sulfuric acid, sulfuryl chloride, substituted sulfuric acids, perchloric acid and the like as catalysts. After acetylation is complete i. e. when the cellulose is present as triacetate having an "acetyl" content of about 60%, to about 62%, the reaction solution is diluted to bring the total concentration of acetic acid in the final solution to about 90 to 100% acetic acid. In other words, the final solution is a solution of cellulose triacetate in about 90 to about 100% acetic acid. In making the dilution the quantity of acetic anhydride must be considered. It has been found that a convenient manner for accomplishing this is to add dilute acetic acid in the form of acetic acid containing about 50 to about 80% acetic acid. Of course, the acetic anhydride present in the acetylation solution combines with the water in the about 50 to about 80% acetic acid and the resulting triacetate solution has an acetic acid concentration of about 90 to about 100%. The acetic acid added under these circumstances may be conveniently used for the introduction of the sodium acetate for the neutralization of the catalyst. The resulting solution when held at a temperature of about 40 to about 50° C. shows no tendency to become an irreversible gel. Analysis shows that there has been no saponification and the cellulose is present as the triacetate assaying about 60 to 62% "actyl" content. This solution of cellulose triacetate in acetic acid of high concentration (90 to 100%) is filtered under vacuum or pressure in an apparatus designed to be heated or well insulated thermally. The filtered solution is deaerated in vacuum and, when desired or necessary, passed to storage after mixing with softening agents. When the present stabilized solution is used for casting or spinning, water or dilute acetic acid may be used as a precipitating agent. The foils, threads and the like are dried in the usual manner after washing.

A surprising discovery has been made in connection with the present invention in that contrary to the expectations of the experts in the art, it has been discovered that solutions of triacetate of cellulose may be stabilized by mixing unstabilized acetylating solutions with stabilized solutions prepared and stabilized in accordance with the principles of the present invention. Thus, cellulose is acetylated in the usual manner to obtain a solution of cellulose triacetate. The catalyst is neutralized and the solution stabilized by proceeding according to the present process. In this manner, unstabilized solutions of cellulose triacetate may be mixed with the present novel stabilized solutions of cellulose triacetate in the proportions of about 1 to 2 parts of unstabilized cellulose triacetate by weight to 1 part of stabilized cellulose triacetate by weight to obtain a stable solution of triacetate of cellulose in acetic acid which is non-gelling and relatively thick at low temperatures (18° C.) and relatively thin at high temperatures (60° C.), which does not coagulate even after two days and which is easily and readily workable.

Those skilled in the art will readily appreciate that the present invention enables the operator to prepare the present stabilized solution of cellulose triacetate having a high concentration of triacetate. Acetic acid of 90% or higher concentration is used as a solvent and many other advantages may be mentioned among which are the following:

The products obtained from these solutions are completely homogeneous in view as well as of content of acetyl as of the viscosity determined in solutions of formic acid. The foils obtained by ejecting the solutions into a bath of diluted acetic acid possess a high strength, good splendour and are completely transparent. By the invention it is now possible to manufacture foils of cellulose triacetate directly from esterifying solutions without any failure in casting.

The present application is a continuation in part of my application Ser. No. 24,051, filed May 29, 1925.

It is to be observed that the process of the present invention is not to be confused with the processes of the prior art especially that described in British Patent No. 362,489, page 3, line 61 to 70. By this latter process the cellulose ester is converted into other solubility stages. In that regard, the inventor has found the surprising fact, that, when heating the esterification solutions, which are produced by means of small quantities of catalysts and which contain cellulose triacetate with a content of 62% CH₃COOH as acetyl groups, only a well determined time, i. e. 4-6 hours, at 80-100°, they can be made stable against coagulation, without being converted into other solubility stages.

On the other hand, the conditions of the proper process of the British Patent No. 362,489 are such as to treat so-called crude solutions, which are obtained by subjecting the cellulose triacetates to hydrolysis in order to convert them to the acetone solubility and which do no more contain acetone insoluble cellulose-triacetates. In order to avoid further hydrolysis of the acetone soluble hydrolyzed acetate the British patent prescribes to add as much water as possible, especially such that the acetic acid contained in the reaction mass shows a concentration of about 50–80%. On the contrary, according to the present invention, the esterification solution, is to contain no or very small quantities of water, so that the acetic acid contained in the solution to be treated, shows a concentration of no less than 90%.

I claim:—

1. A method of preparing stable solutions of acetone insoluble triacetate soluble in concentrated acetic acid and substantially devoid of lower acetates of cellulose and hydrolysis products of cellulose which comprises acetylating cellulose in the presence of a catalyst until an acetyl content greater than about 60% acetyl content is obtained, neutralizing the catalyst and thereafter heating said solution for about 4 to about 6 hours at a temperature of about 80° C. to about 100° C. whereby solutions of triacetate of acetone insoluble cellulose soluble in concentrated acetic acid and substantially devoid of lower acetates of cellulose and products of the hydrolysis of cellulose and capable of storage without coagulation for a relatively long period of time are produced.

2. A method of preparing stable concentrated acetic acid solutions of acetone insoluble triacetate of cellulose substantially devoid of lower acetates of cellulose and hydrolysis products of cellulose which comprises neutralizing the catalyst present in an acetylation solution containing about 120 to about 220 grams of triacetate of cellulose per kilo and having an acetyl content not less than about 60%, acetic acid and acetic acid anhydride, adding sufficient dilute acetic acid containing about 50 to about 80% acetic acid to make the final acetic acid concentration about 90 to about 100% and thereafter maintaining the solution at a temperature of about 40 to about 50° C. whereby stable, non-coagulating solutions of triacetate of acetone insoluble cellulose having an acetyl content of about 60 to about 62% dissolved in acetic acid of about 90 to about 100% concentration and substantially devoid of lower acetates of cellulose and hydrolysis products of cellulose are produced.

3. A method of preparing stable acetic acid solutions of triacetate of acetone insoluble cellulose which comprises preparing an acetylation mixture of triacetate of cellulose containing about 120 to about 220 grams of triacetate of cellulose per kilo having an acetyl content of about 60 to about 62% and being substantially devoid of lower acetates of cellulose and hydrolysis products of cellulose, and containing acetic acid, acetic acid anhydride and a catalyst, adding sufficient sodium acetate to neutralize said catalyst, removing excess acetic acid anhydride so that acetic acid is present in form of 96–98% acid and thereafter heating said solution at a temperature of about 80 to about 100° C. for about 4 to about 6 hours without saponification whereby a stable acetic acid solution of acetone insoluble triacetate of cellulose having an acetyl content of about 60 to about 62% and being substantially devoid of lower acetates of cellulose and hydrolysis products of cellulose is obtained.

4. A method of preparing stable solutions of acetone insoluble triacetate of cellulose soluble in concentrated acetic acid of greater than 90% acetic acid concentration which comprises establishing an acetylation solution containing completely acetylated cellulose and substantially devoid of lower acetates of cellulose, neutralizing the catalyst present, removing excess acetic anhydride, thereafter heating said solution at a temperature of about 80° C. to about 100° C. for about 4 to about 5 hours, and mixing about 1 part by weight of said heated solution of triacetate of cellulose with about 1 to about 2 parts by weight of an unheated solution of triacetate of cellulose substantially devoid of lower acetates of cellulose whereby a stable solution of acetone insoluble triacetate of cellulose in concentrated acetic acid, substantially devoid of lower acetates of cellulose and capable of storage for at least two days without coagulating is produced.

KARL WERNER.